United States Patent
Miyao et al.

(10) Patent No.: US 7,261,470 B2
(45) Date of Patent: Aug. 28, 2007

(54) OPTICAL RECEPTACLE ADAPTED FOR CONNECTION TO AN OPTICAL PLUG

(75) Inventors: Taichiro Miyao, Kanagawa (JP); Shinji Uchida, Kanagawa (JP); Minoru Tanaka, Tottori (JP); Yuzo Mizuta, Tottori (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/541,759

(22) PCT Filed: Nov. 21, 2003

(86) PCT No.: PCT/JP03/14878

§ 371 (c)(1), (2), (4) Date: Jun. 2, 2006

(87) PCT Pub. No.: WO2004/063785

PCT Pub. Date: Jul. 29, 2004

(65) Prior Publication Data

US 2006/0269195 A1  Nov. 30, 2006

(30) Foreign Application Priority Data

Jan. 10, 2003  (JP) .............................. 2003-003935

(51) Int. Cl.
*G02B 6/38* (2006.01)
(52) U.S. Cl. ........................................ 385/70; 439/567
(58) Field of Classification Search .................. 385/75; 439/577, 676, 567
See application file for complete search history.

(56) References Cited

U.S. PATENT DOCUMENTS 4,457,570 A * 7/1984 Bogese, II .................. 439/59

(Continued)

FOREIGN PATENT DOCUMENTS

EP  1102097 A2  5/2001

(Continued)

OTHER PUBLICATIONS

International Search Report, Application No.: PCT/JP03/14878, mailed on Mar. 9, 2004.

(Continued)

*Primary Examiner*—Hae Moon Hyeon
(74) *Attorney, Agent, or Firm*—Rader, Fishman & Grauer PLLC

(57) ABSTRACT

The optical receptacle according to the present invention is attached to a printed board and an optical plug can be connected thereto. The optical receptacle comprises a tubular main housing and a socket housing which is inserted into and attached to the main housing. The main housing has an elastic locking part which protrudes from the outer circumference surface and locks onto the printed board, and the socket housing has a locking slotted pin which protrudes from the outer circumference surface and locks onto the printed board. This optical receptacle is attached to the printed board after the two pieces, the main housing and the socket housing, are assembled. As a result, the construction of the optical receptacle can be simplified because ground pins become unnecessary. Additionally, the optical receptacle can be easily attached to a printed board because it does not have to be welded onto the printed board with the ground pins.

19 Claims, 9 Drawing Sheets

U.S. PATENT DOCUMENTS

| | | | |
|---|---|---|---|
| 4,688,875 A * | 8/1987 | O'Connor | 439/676 |
| 6,312,293 B1 * | 11/2001 | Wang | 439/677 |
| 6,499,889 B1 * | 12/2002 | Shirakawa et al. | 385/88 |
| 6,517,252 B2 * | 2/2003 | Yamaguchi | 385/53 |
| 6,558,045 B2 * | 5/2003 | Yamaguchi | 385/75 |
| 6,588,947 B2 * | 7/2003 | Mine et al. | 385/92 |
| 6,652,154 B2 * | 11/2003 | Shirakawa et al. | 385/70 |
| 6,761,586 B2 * | 7/2004 | Kayama et al. | 439/567 |

FOREIGN PATENT DOCUMENTS

| | | |
|---|---|---|
| EP | 1118892 A1 | 7/2001 |
| EP | 1170613 A2 | 1/2002 |
| EP | 1237231 A1 | 9/2002 |
| JP | 60-057272 A | 4/1985 |
| JP | 03-167508 A | 7/1991 |
| JP | 03-167510 A | 7/1991 |
| JP | 05-075307 A | 3/1993 |
| JP | 08-110444 A | 4/1996 |
| JP | 2000-347073 A | 12/2000 |
| JP | 2001-337249 A | 12/2001 |
| TW | 500233 | 8/2002 |

OTHER PUBLICATIONS

Taiwan Notice of Reasons for Rejection, Nov. 30, 2004 (with Japanese Translation).

Taiwan Decision of Final Rejection, May 23, 2005 (with Japanese Translation).

* cited by examiner

OPTICAL RECEPTACLE ADAPTED FOR CONNECTION TO AN OPTICAL PLUG

FIELD OF THE INVENTION

The present invention relates to an optical receptacle which is attached to a printed board and to which an optical plug can be connected, and for example, relates to an optical receptacle which carries an internal optical element which is connected to an optical plug attached to the end of an optical fiber to connect the optical fiber and optical element.

RELATED ART

Conventionally, Plastic Optical Fiber (hereinafter POF) is used to transmit signals quickly and at low costs. As optical connector corresponding to this POF, there is Small Multimedia Interface (hereinafter referred to as SMI)-type optical connector. SMI-type optical connectors such as this are utilized in digital household appliances such as televisions and DVD (Digital Versatile Disc), and the standardization thereof is being implemented.

The SMI-type optical connector comprises, for example, an optical plug and an optical receptacle to which this optical plug is attached. This optical connector has a push/pull fastening structure which is compact and securely locks the optical plug and optical receptacle.

The foregoing optical receptacle has, for example, a two-piece structure of inner-housing to which an optical element is embedded and outer-housing which locks the optical plug (for example, Patent Laid-Open Publication No. 2000-347073).

Specifically, the outer-housing is box-shaped and has a connection edge to which the optical plug is inserted. Within the outer-housing, an elastic engagement piece is provided in the direction of the connection edge. The optical plug can be fixed to the outer-housing by inserting the optical plug into the connection edge and engaging to the elastic engagement piece.

On the other hand, the inner-housing has an optical element receiving cavity to which the optical element is stored. Here, the optical element has a duplex structure with separate transmission end and receiving end. After optical element is inserted into the optical element receiving cavity of the inner-housing, this inner-housing is inserted into the joint cavity formed within the outer-housing. Then, the relative position of the outer-housing and the inner-housing is stipulated by the three directions which are mutually perpendicular, and the optical element within the inner-housing is positioned in a fixed position within the outer-housing.

Incidentally, the inner-housing is formed from synthetic resin material comprising carbon filler. In addition, ground pins which penetrate the outer-housing are implanted in the inner-housing. These ground pins are soldered to the ground circuit of the printed board which will be the connection body of the optical receptacle.

By connecting inner-housing which has conducting properties to the ground circuit via ground pins in this way, EMI (Electro Magnetic Interference) and electrostatic destruction can be prevented.

Incidentally, because the ground pins are fixed to the printed board by soldering in conventional receptacles, not only does the number of parts increase, but assembly man-hours increase as well. Therefore, an optical receptacle which can be easily attached to a printed board is required.

SUMMARY OF THE INVENTION

The object of the present invention is to provide an optical receptacle which can be easily attached to a printed board to remedy the foregoing issues.

In order to achieve the object above, the inventors of this present invention have invented a new optical receptacle such as that below.

(1) An optical receptacle for being attached to a printed board and to which an optical plug can be connected comprising: a tubular main housing; and a socket housing which is inserted and attached to the main housing; wherein the main housing has an elastic locking part which protrudes from the outer circumference surface and locks onto the printed board; and the socket housing has a locking slotted pin which protrudes from the outer circumference surface and locks onto the printed board.

The optical receptacle is, for example, implemented in Small Multimedia Interface-type optical plugs.

The invention according to (1) differs from instances wherein the optical receptacle is fixed on to a printed board via ground pins such as in conventional receptacles, and rather, has an elastic locking part on the outer circumference surface of the main housing instead of ground pins and has a locking slotted pin on the outer circumference surface of the socket housing.

Therefore, this optical receptacle is attached to a printed board after the two pieces, main housing and socket housing, are assembled. As a result, this optical receptacle has a simple structure because ground pins are not required. Furthermore, this optical receptacle can be easily attached to a printed board because it does not have to be welded onto the printed board with the ground pins.

(2) The optical receptacle according to (1), wherein the main housing comprises a connection opening part to which the optical plug is inserted, and within the main housing comprises an elastic claw which extends towards the connection opening part; and the elastic claw holds the optical plug within the main housing by engaging with the optical plug inserted from the connection opening.

According to the invention in (2), the optical plug is held within the optical receptacle because the elastic claw engages with this optical plug when the optical plug is inserted into the connection opening part. As a result, the optical plug can be easily attached to the optical receptacle.

(3) The optical receptacle according to (1) or (2), wherein locking holes into which the elastic locking part of the main housing and the locking slotted pin of the socket housing are inserted respectively are formed on the printed board.

According to the invention in (3) the optical receptacle can be attached to and removed from the printed board freely by inserting and removing the elastic locking part and the locking slotted pin from the locking holes without welding the optical receptacle to the printed board with ground pins, such as in conventional receptacles.

(4) The optical receptacle according to any one of (1) to (3), wherein the socket housing is capable of storing optical elements, formed from synthetic resin material containing conductive filler, is electrically conductive between the optical element and the printed board.

According to the invention in (4), EMI and electrostatic destruction of the optical element can be prevented because the optical element can be electrically conducted to the printed board via the socket housing.

(5) The optical receptacle according to (4), wherein the conductive filler is a carbon filler.

(6) The optical receptacle according to any one of (3) to (5), wherein the elastic locking part has a first elastic locking part and a second elastic locking part; and the first elastic locking part and the second elastic locking part, respectively comprise a main body which protrudes from the main housing and extends linearly, and a locking part which protrudes from the main body which is locked to the locking hole of the printed board; and the locking parts are positioned so as to face each other.

According to the invention in (6), when the first elastic locking part and the second elastic locking part are respectively inserted into the locking holes formed on the printed board, the space between the locking parts expands, the locking parts are pressed against the edges of the locking holes, and the main body is elastically deformed. Then, when the first elastic locking part and the second elastic locking part are completely inserted into the locking holes, the locking part is locked onto the locking hole by the elastic restorative force of the main body. Therefore, the main housing is prevented from easily separating from the printed board.

(7) The optical receptacle according to any one of (3) to (5), wherein the elastic locking part has a first elastic locking part and a second elastic locking part, and the first elastic locking part and the second elastic locking part respectively comprise a main body which protrudes from the main housing and extends linearly, and a locking part which protrudes from the main body and is locked to the locking hole of the printed board; and the locking parts are positioned facing in the opposite direction of each other.

According to the invention in (7), when the first elastic locking part and the second elastic locking part are respectively inserted into the locking holes formed on the printed board, the locking parts are pressed against the edges of the locking holes, the space between the locking parts narrows, and the main body is elastically deformed. Then, when the first elastic locking part and the second elastic locking part are completely inserted into the locking holes, the locking part is locked onto the locking hole by the elastic restorative force of the main body. Therefore, the main housing is prevented from easily fall off from the printed board.

(8) The optical receptacle in (5) or (6), comprising a plural of the elastic locking parts, and the direction in which the plurality of first elastic locking parts are aligned and the direction in which the plurality of second elastic locking parts are aligned in parallel.

According to the invention in (8), the position of the optical receptacle to the printed board can be held in a more stable state.

DESCRIPTION OF THE PREFERRED EMBODIMENT

Each embodiment of the present invention is described below based on the drawings. In the description of the embodiments below, the same reference numbers are affixed to the same construction requisite and explanations therefor are omitted or simplified.

First Embodiment

Figure 1:
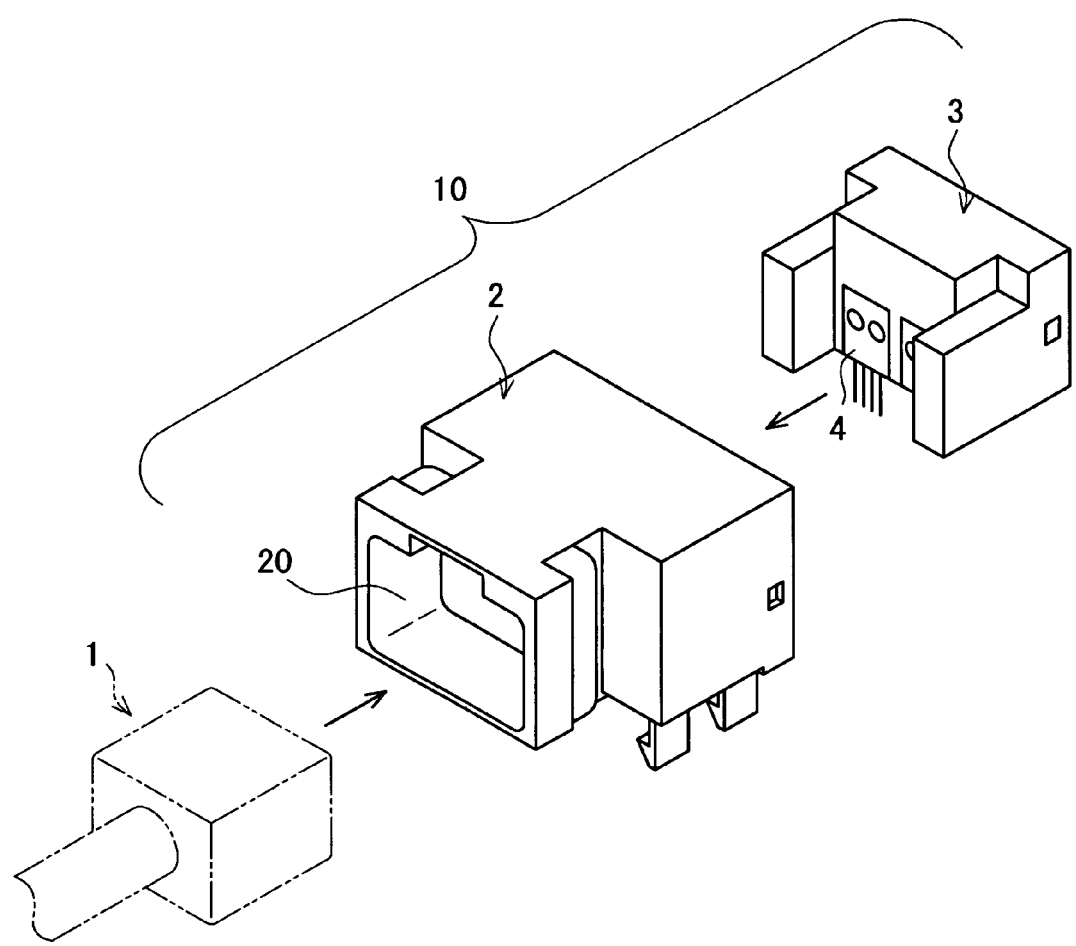
FIG. 1 is an exploded perspective view showing the structure of an optical receptacle according to this embodiment.

FIG. 1 is an exploded perspective view showing the structure of an optical receptacle 10 according to this embodiment.

In this embodiment, an optical receptacle 10 is attached to a printed board and an SMI-type optical plug for POF is connected thereto.

The optical receptacle 10 comprises a main housing 2 and a socket housing 3 which is inserted into and attached to this main housing 2.

Figure 2A:
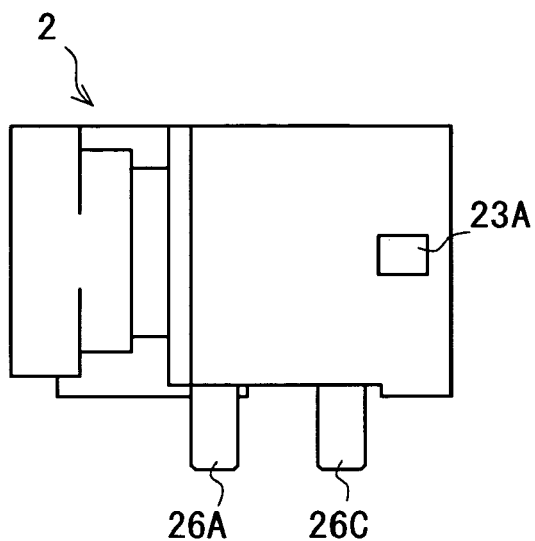
FIG. 2A is a front elevational view of the main housing according to this embodiment.
Figure 2B:
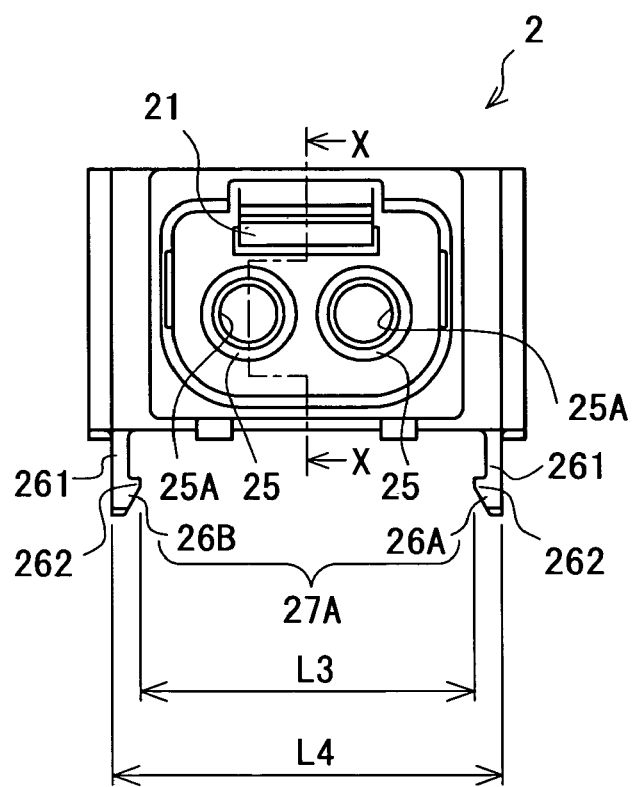
FIG. 2B is a left-side view of the main housing of the embodiment.
Figure 2C:
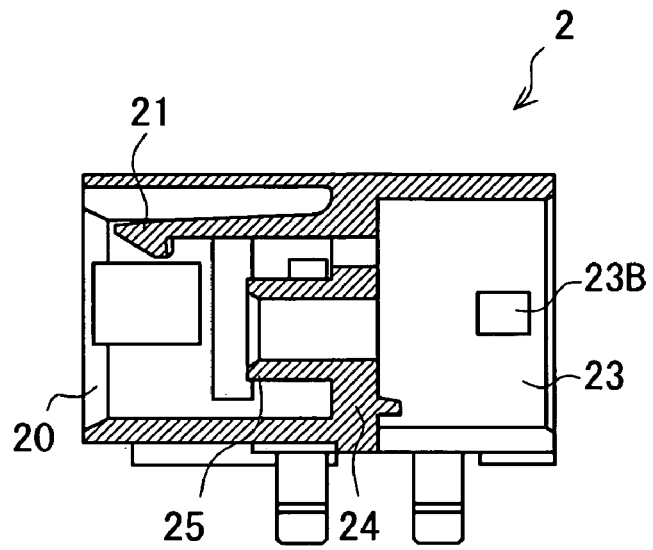
FIG. 2C is a cross-sectional view in the X-X direction in FIG. 2B.
Figure 2D:
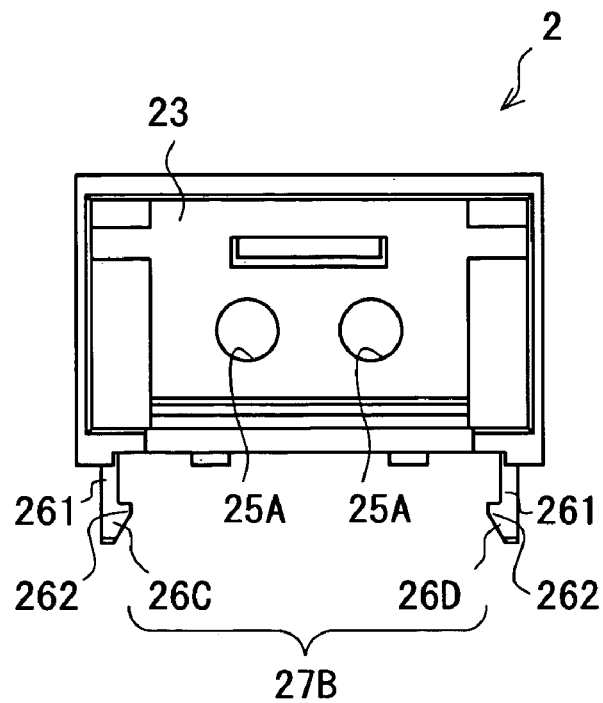
FIG. 2D is a right-side view of the main housing of the embodiment.

FIG. 2A is a front elevational view of the main housing 2 according to this embodiment; FIG. 2B is a left-side view of the main housing 2; FIG. 2C is a cross-sectional view in the X-X direction in FIG. 2B; and FIG. 2D is a right-side view of the main housing 2.

The main housing 2 is tubular. A connection opening part 20 to which an optical plug 1 is inserted is formed on one end, and a joint opening part 23 to which the socket housing 3 is inserted is formed on the other end.

Within the main housing 2, a partition 24 is formed to divide the connection opening part 20-side and the joint opening part 23-side. A pair of cylindrical cylinder convex parts 25 is formed on the partition 24 to protrude towards the connection opening part 20-side.

A photoconductive entrance path 25A is formed on the inner circumference surface of the pair of cylinder convex parts 25, and when the main housing 2 and the socket housing 3 are assembled, a received luminous element 4 (FIG. 1), described hereafter, passes through photoconductive entrance path 25A and transmits and receives optical signals.

In addition, as shown in FIG. 2C, an elastic claw 21 which extends towards the connection opening part 20 is formed in a cantilevered beam-shape on the partition 24. This elastic claw 21 holds the optical plug 1 within the main housing 2 by locking onto the optical plug 1 which is inserted into the connection opening part 20. In other words, the optical plug 1 and the optical receptacle have a push/pull fastening structure.

Furthermore, on the outer circumference surface of the main housing 2, as shown in FIG. 2A and FIG. 2C, rectangular locking small holes 23A and 23B which penetrate to the joint opening part 23-side within the internal space of the main housing 2 are formed. A pair of locking small projection 35A and 35B (FIG. 3C), described hereafter, are inserted into these locking small holes 23A and 23B from the interior of the main housing 2.

As shown in FIG. 2B and FIG. 2D, the main housing 2 has plural elastic locking parts 27A and 27 B which protrudes from the outer circumference surface (undersurface) and locks onto a printed board 5 (FIG. 4), described hereafter.

The elastic locking part 27A comprises a first locking part 26A and a second locking part 26B. The elastic locking part 27B comprises a first locking part 26C and a second locking part 26D.

The direction in which the plural first elastic locking parts 26A and 26C are aligned and the direction in which the plural second locking parts 26B and 26D are aligned are parallel.

The first elastic locking part 26A and 26C and the second elastic locking part 26B and 26D each comprise a main body 261 which protrudes from the main housing 2 and extends linearly and a locking part 262 which protrudes from this main body 261 and is locked onto square holes 5A and 5B (FIG. 4), described hereafter, of the printed board. The locking part 262 of the first elastic locking part 26A and 26C and the locking part 262 of the second elastic locking part 26B and 26D are positioned facing each other.

Figure 3A:
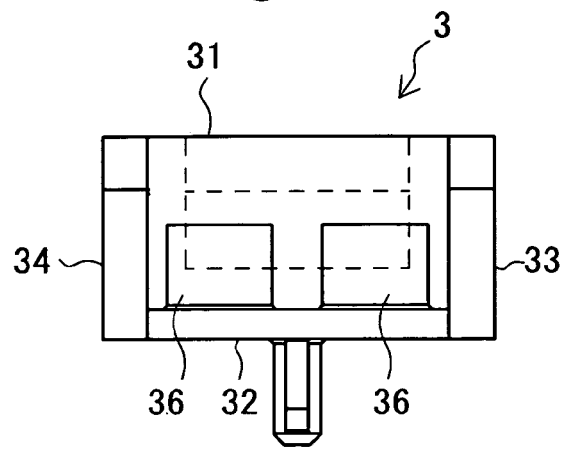
FIG. 3A is a front elevational view of the socket housing of the embodiment.
Figure 3B:
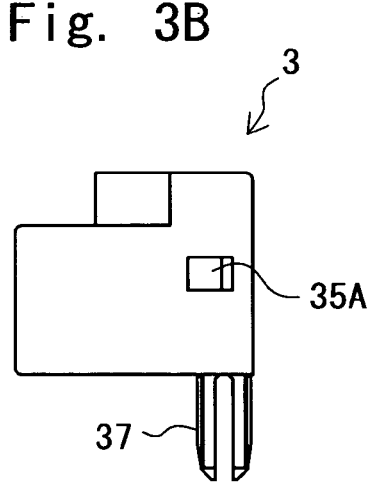
FIG. 3B is a right-side view of the socket housing of the embodiment.
Figure 3C:
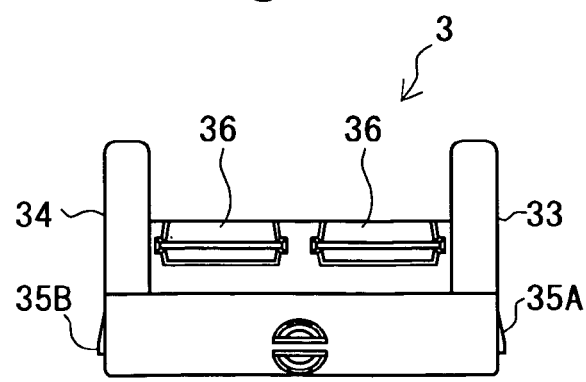
FIG. 3C is a bottom view of the socket housing of the embodiment.

FIG. 3A is a front elevational view of the socket housing 3; FIG. 3B is a right-side view of the socket housing 3; and the FIG. 3C is a bottom view of the socket housing 3.

Socket housing 3 has a received luminous element 4 as the optical element (refer to FIG. 1). Here, the received luminous element 4 is a photoelectric element of integrated light receiving element (photo transistor) and luminous element (light-emitting diode).

Socket housing 3 is a molded object formed from synthetic resin material containing conductive filler, or more specifically, carbon filler, and as shown in FIG. 3A, has outer walls formed into a rough rectangular shape by upper wall 31, lower wall 32, right wall 33, and left wall 34. The outer walls of the socket housing 3 are in close contact to the inner circumference surface of the joint opening part 23-side of the main housing 2 when socket housing 3 is inserted into the main housing 2.

A locking small projection 35A which has a triangular cross-section is formed to protrude from the right wall 33. Similarly, a locking small projection 35B which has a triangular cross-section is formed to protrude from the left wall 34. According to these locking small projections 35A and 35B, when socket housing 3 is inserted into the joint opening part 23 of the main housing 2, the slanted sections of the locking small projections 35A and 35B press open the inner circumference surface of the main housing 2. Subsequently, when the socket housing 3 is completely placed within the main housing 2, the locking small projections 35A and 35B are locked onto locking small holes 23A and 23B, the inner circumference surface of the joint opening part 23 which has been pressed open returns to is original state, and the socket housing 3 is held within the main housing 2.

As shown in FIG. 3A and FIG. 3C, a pair of element attachment grooves 36 is formed within the socket housing 3. Prior to attaching the socket housing 3 to the main housing 2, two received luminous elements 4 are fixed by adhesive to the element attachment grooves 36.

The socket housing 3 has a locking slotted pin 37 which protrudes from the outer circumference surface (bottom surface) and locks onto round hole 5E (FIG. 4) of the printed board 5, described hereafter.

Figure 4:
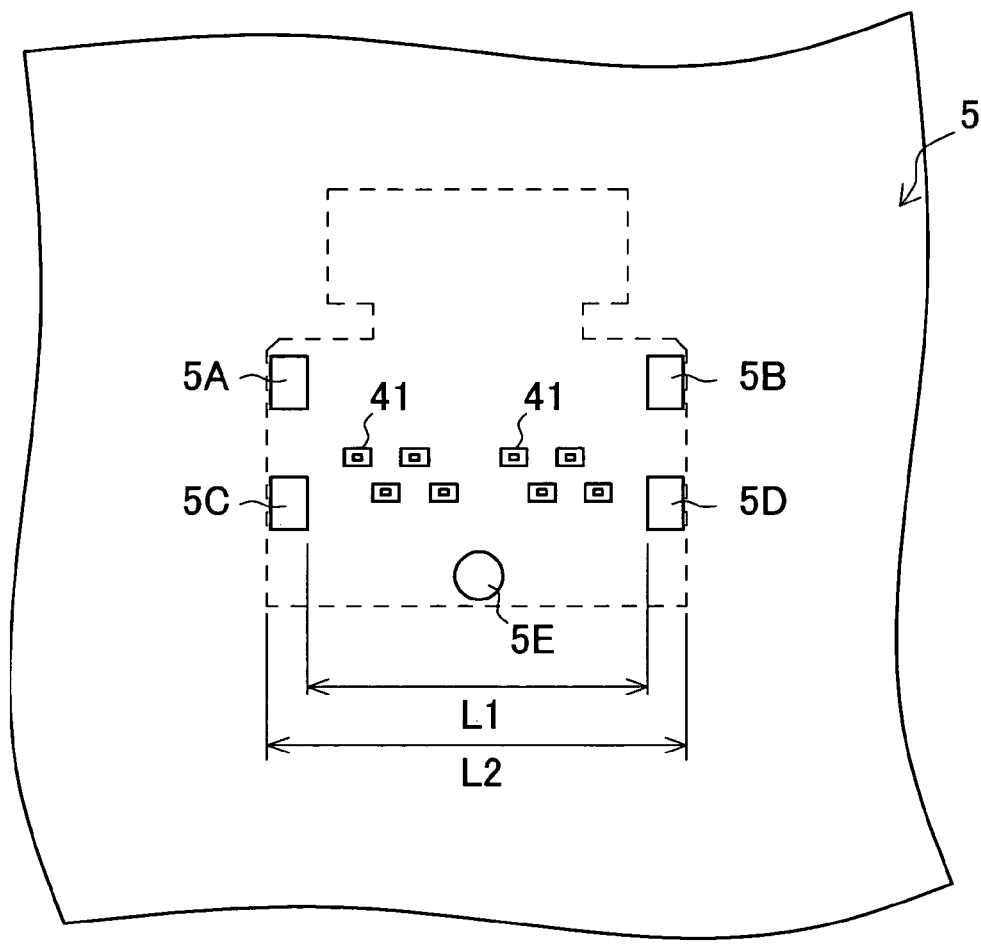
FIG. 4 is a top view of the printed board to which the optical receptacle is attached to the embodiment.

FIG. 4 is a top view of the printed board 5 to which the optical receptacle 10 is attached.

Square holes 5A and 5B as locking holes to which the first elastic locking part 26A and 26B are locked, square holes 5C and 5D as locking holes to which the second elastic locking part 26C and 26D are locked, round hole 5E as a locking hole to which the locking slotted pin 37 is locked, and terminal hole 41 to which the lead terminal of the received luminous element is mounted are formed on the printed board 5.

The round hole 5E and terminal hole 41 are through-holes. The round hole 5E has an inner diameter which is slightly smaller than the outer diameter of the locking slotted pin 37 and is connected to the ground pattern formed on the printed board 5.

If the space between the inner edge of the square hole 5A and the inner edge of the square hole 5B (or, the inner edge of the square hole 5C and the inner edge of the square hole 5D) is L1 and the space between the inner edge of the elastic locking part 26A and the inner edge of the elastic locking part 26B (or, the space between the inner edge of the elastic locking part 26C and the inner edge of the elastic locking part 26D) is L3 (refer to FIG. 2B), L1>L3.

If the space between the outer edge of the square hole 5A and the outer edge of the square hole 5B (or, the outer edge of the square hole 5C and the outer edge of the square hole 5D) is L2 and the space between the outer edge of the elastic locking part 26A and the outer edge of the elastic locking part 26B (or, the space between the outer edge of the elastic locking part 26C and the outer edge of the elastic locking part 26D) is L4 (refer to FIG. 2B), L2>L4.

Next, the procedure for assembling the optical receptacle according to the present invention is explained based on the drawings.

Figure 5A:
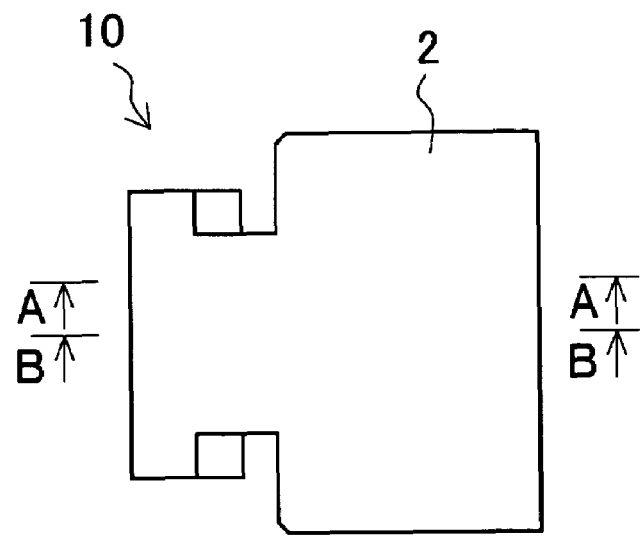
FIG. 5A is a top view of the optical receptacle of the embodiment.
Figure 5B:
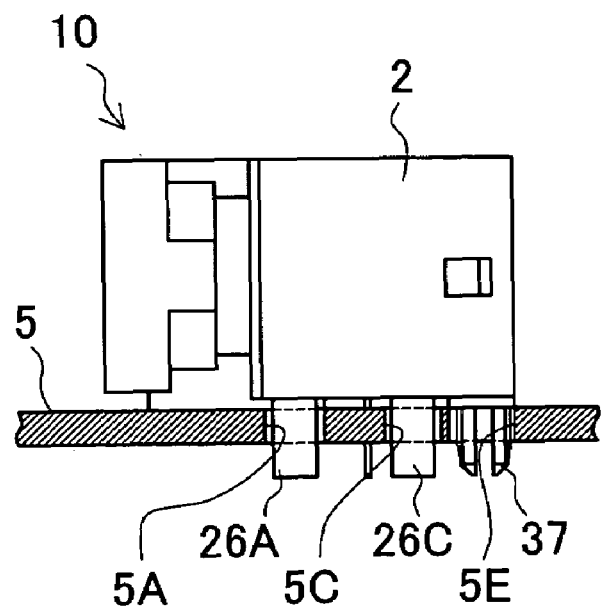
FIG. 5B is a front elevational view of the optical receptacle of the embodiment.
Figure 5C:
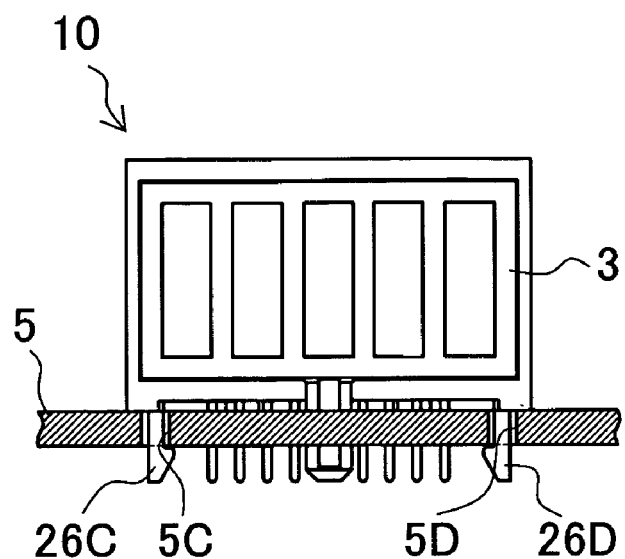
FIG. 5C is a right-side view of the optical receptacle of the embodiment.
Figure 5D:
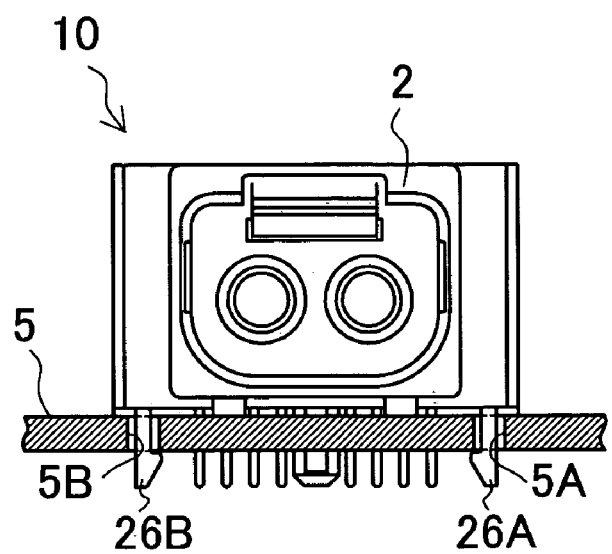
FIG. 5D is a left-side view of the optical receptacle of the embodiment.

FIG. 5A is a top view of the optical receptacle 10; FIG. 5B is a front elevational view of the optical receptacle 10; FIG. 5C is a right-side view of the optical receptacle 10; and FIG. 5D is a left-side view of the optical receptacle 10.

Figure 6A:
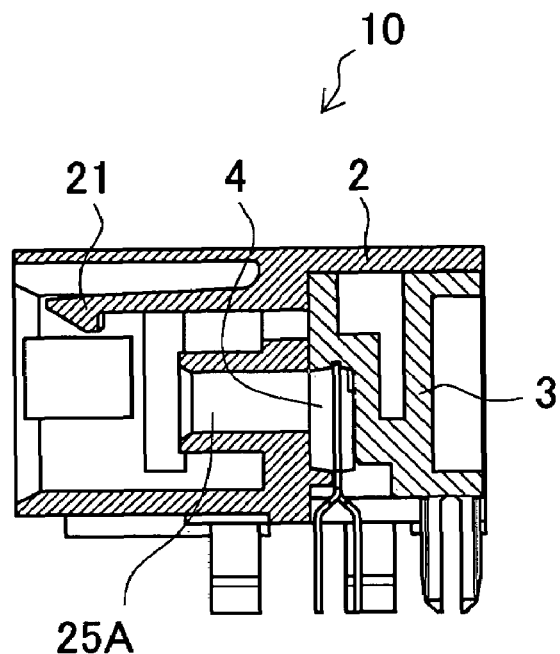
FIG. 6A is a cross-sectional diagram in the B-B direction in FIG. 5A.
Figure 6B:
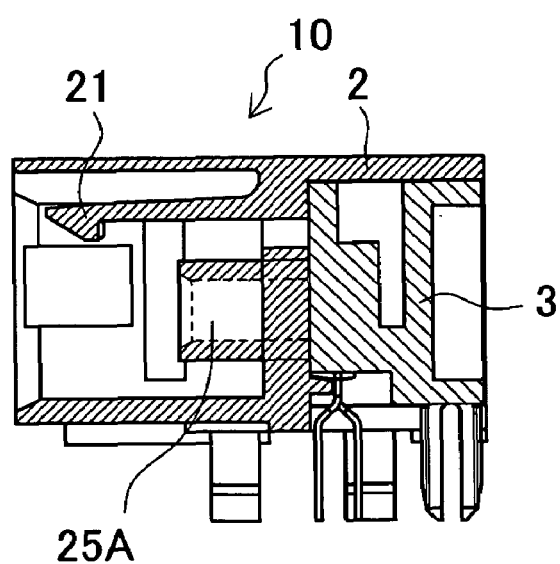
FIG. 6B is a cross-sectional diagram in the A-A direction in FIG. 5A.

In addition, FIG. 6A is a cross-sectional diagram in the B-B direction in FIG. 5A, and FIG. 6B is a cross-sectional diagram in the A-A direction in FIG. 5A.

First, as shown in FIG. 6A and FIG. 6B, the optical receptacle 10 is assembled by attaching received luminous element 4 to socket housing 3 and inserting this socket housing 3 into the main housing 2.

Subsequently, this optical receptacle 10 is attached to the printed board 5. More particularly, the elastic locking parts 26A to 26D are inserted into square holes 5A to 5D. Then, the locking parts of the elastic locking parts 26A to 26D are pressed against the edges of the square holes 5A to 5D, the spaces between the locking parts expand, and the main bodies of the elastic locking parts 26A to 26D become elastically deformed. Then, after the elastic locking parts 26A to 26D are completely inserted into square holes 5A to 5D, the locking parts are locked onto the square holes 5A to 5D due to the elastic restorative force of the main body. Therefore, the main housing 2 can be prevented from easily separating from the printed board 5.

At the same time, the locking slotted pin 37 is inserted into the round hole 5E. Then, the locking slotted pin 37 is pressed against the edges of the round hole 5E and becomes elastically deformed, and the outer diameter becomes small. Subsequently, after the locking slotted pin 37 is completely inserted into the round hole 5E, the locking slotted pin 37 biases the edges of the round hole 5E due to elastic restorative force, and the socket housing 3 is held to the printed board 5 by the frictional force with round hole 5E.

Through this, the locking slotted pin 37 of the socket housing 3 is connected to the ground pattern formed on the printed board 5, the received luminous element 4 and printed board 5 become electrically conductive, and EMI and electrostatic destruction of the received luminous element 4 can be prevented.

Second Embodiment

In this embodiment, the attachment structure of the optical receptacle 10 differs from the first embodiment.

Figure 7A:
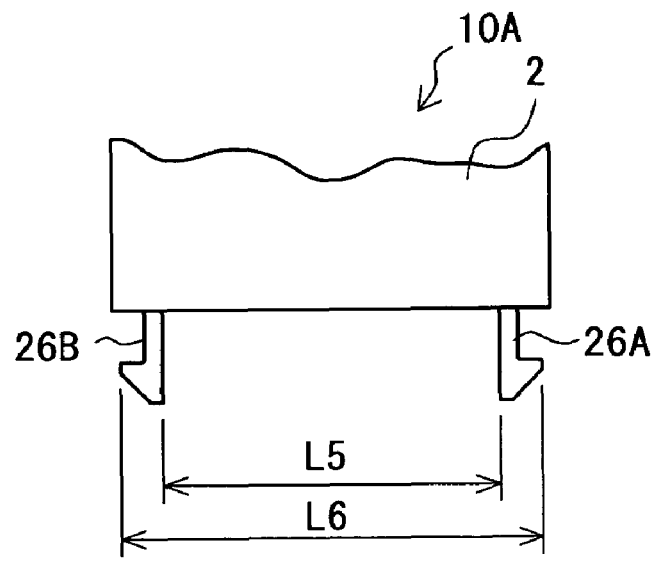
FIG. 7A is a partially enlarged front elevational view of the optical receptacle of the second embodiment
Figure 7B:
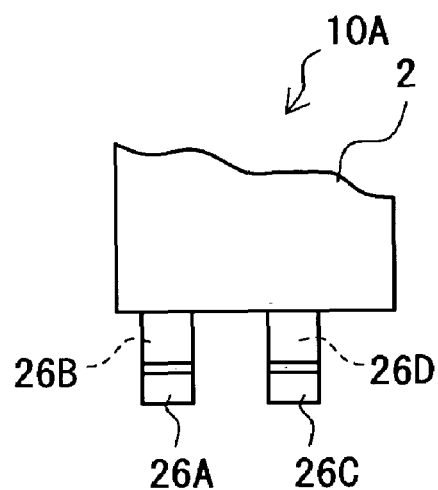
FIG. 7B is a partially enlarged front elevational view of the optical receptacle of the second embodiment.

FIG. 7A is a partially enlarged front elevational view of the optical receptacle 10A, and FIG. 7B is a partially enlarged front elevational view of the optical receptacle 10A.

In this embodiment, the locking parts of the first elastic locking parts 26A and 26C and the second elastic locking parts 26B and 26D respectively comprise a main body and a locking part which protrudes from the main body. The locking parts of the first elastic locking parts 26A and 26C and the locking parts of the second elastic locking parts 26B and 26D are positioned facing in the opposite direction of each other.

In other words, if the space between the inner edge of the elastic locking part 26A and the inner edge of the elastic locking part 26B (or, the inner edge of the elastic locking part 26C and the inner edge of the elastic locking part 26D) is L5, L5>L1.

If the space between the outer edge of the elastic locking part 26A and the outer edge of the elastic locking part 26B (or, the outer edge of the elastic locking part 26C and the outer edge of the elastic locking part 26D) is L6, L6>L2.

In this embodiment, when attaching this optical receptacle 10 to the printed boars 5, the elastic locking parts 26A to 26D are inserted into the square holes 5A to 5D. Then, the locking parts of the elastic locking parts 26A to 26D are presses against the edges of the square holes 5A to 5D, the spaces between the locking parts become narrow, and the main body of the elastic locking part 26A to 26D become elastically deformed. Then, after the elastic locking parts 26A to 26D are completely inserted into the square holes 5A to 5D, the locking parts lock onto the square holes 5A to 5D due to the elastic restorative force of the main body. Therefore, the main housing 2 can be prevented from easily separating from the printed board 5.

According to the present invention, the effects are such as that below.

Unlike instances wherein the optical receptacle is fixed on to a printed board via ground pins such as in conventional receptacles, an elastic locking part is provided on the outer circumference surface of the main housing instead of ground pins and a locking slotted pin is provided on the outer circumference surface of the socket housing.

Therefore, this optical receptacle is attached to a printed board after the two pieces, the main housing and the socket housing, are assembled. As a result, the construction of the optical receptacle can be simplified because ground pins become unnecessary. Additionally, this optical receptacle can be easily attached to a printed board because it does not have to be welded onto the printed board with the ground pins.

What is claimed is:

1. An optical receptacle for being attached to a printed board and to which an optical plug can be connected comprising:
    a tubular main housing; a socket housing which is inserted and attached to the main housing;
    elastic locking parts, which extend from an outer peripheral surface of the tubular main housing, locking into the printed board; and
    a locking slotted pin, which is mechanically integral with the socket housing and extends from an outer peripheral surface of the socket housing, locking into the printed board,
    wherein the locking slotted pin provides an electrical connection between the socket housing and the printed board.

2. The optical receptacle according to claim 1, wherein the main housing comprises a connection opening part into which the optical plug is inserted, and
    an elastic claw extending towards the connection opening part inside the main housing, and wherein the elastic claw holds the optical plug within the main housing by engaging with the optical plug inserted from the connection opening.

3. The optical receptacle according to claim 1 or 2, wherein locking holes, into which the elastic locking parts of the main housing and the locking slotted pin of the socket housing are respectively inserted, are formed on the printed board.

4. The optical receptacle according to claim 1 or 2, wherein the socket housing is capable of storing optical elements, and made of synthetic resin material containing conductive filler so as to provide an electrical connection between the optical elements and printed board.

5. The optical receptacle according to claim 4, wherein the conductive filler is a carbon filler.

6. The optical receptacle according to claim 3, wherein an elastic locking part has a first elastic locking part and a second elastic locking part,
    wherein the first elastic locking part and the second elastic locking part respectively comprise a main body extending straight from the main housing and a locking member which extends from the main body so as to be engaged with a locking hole of the printed board, and
    wherein the locking members are positioned so as to face each other.

7. The optical receptacle according to claim 3, wherein an elastic locking part has a first elastic locking part and a second elastic locking part, wherein the first elastic locking part and the second elastic locking part respectively comprise a main body extending straight from the main housing and a locking member which extends from the main body so as to be engaged with a locking hole of the printed board, and
    wherein locking members are positioned so as to oppositely face each other.

8. The optical receptacle according to claim 6, wherein a first line including a plurality of first elastic locking parts and a second line including a plurality of second elastic locking parts are aligned in parallel.

9. The optical receptacle according to claim 3, wherein the socket housing is capable of storing optical elements and made of synthetic resin material containing conductive filler so as to provide an electrical connection between the optical elements and the printed board.

10. The optical receptacle according to claim 4, wherein an elastic locking part has a first elastic locking part and a second elastic locking part, wherein the first elastic locking part and the second elastic locking part respectively comprise a main body extending straight from the main housing and a locking member which extends from the main body so as to be engaged with a locking hole of the printed board, and wherein locking members are positioned so as to face each other.

11. The optical receptacle according to claim 5, wherein an elastic locking part has a first elastic locking part and a second elastic locking part, wherein the first elastic locking part and the second elastic locking part respectively comprise a main body extending straight from the main housing and a locking member which extends from the main body so as to be engaged with a locking hole of the printed board, and wherein locking members are positioned so as to face each other.

12. The optical receptacle according to claim 4, wherein an elastic locking part has a first elastic locking part and a second elastic locking part, wherein the first elastic locking part and the second elastic locking part respectively comprise a main body extending straight from the main housing and a locking member which extends from the main body so as to be engaged with a locking hole of the printed board; and wherein locking members are positioned so as to oppositely face each other.

13. The optical receptacle according to claim 5, wherein an elastic locking part has a first elastic locking part and a second elastic locking part, wherein the first elastic locking part and the second elastic locking part respectively comprise a main body extending straight from the main housing and a locking member which projects from the main body so as to be engaged with a locking hole of the printed board; and wherein locking members are so as to oppositely face each other.

14. The optical receptacle according to claim 9, wherein the conductive filler is a carbon filler.

15. The optical receptacle according to claim 9, wherein an elastic locking part has a first elastic locking part and a second elastic locking part, wherein the first elastic locking part and the second elastic locking part respectively comprise a main body extending straight from the main housing and a locking member which projects from the main body so as to be engaged with a locking hole of the printed board, and wherein locking members are positioned so as to face each other.

16. The optical receptacle according to claim 14, wherein an elastic locking part has a first elastic locking part and a second elastic locking part, wherein the first elastic locking part and the second elastic locking part respectively comprise a main body extending straight from the main housing and a locking member which projects from the main body so as to be engaged with a locking hole of the printed board, and wherein locking members are positioned so as to face each other.

17. The optical receptacle according to claim 9, wherein an elastic locking part has a first elastic locking part and a second elastic locking part, wherein the first elastic locking part and the second elastic locking part respectively comprise a main body extending straight from the main housing and a locking member which extends from the main body so as to be engaged with a locking hole of the printed board, and wherein locking members are so as to oppositely face each other.

18. The optical receptacle according to claim 14, wherein an elastic locking part has a first elastic locking part and a second elastic locking part, wherein the first elastic locking part and the second elastic locking part respectively comprise a main body extending straight from the main housing and a locking member which projects from the main body so as to be engaged with a locking hole of the printed board, and wherein locking members are positioned so as to oppositely face each other.

19. An optical receptacle, comprising:

a tubular main housing extending along a longitudinal axis and having a passageway extending longitudinally therethough, the tubular main housing having a partition, at least one cylindrical convex part, an elastic claw, two pairs of opposing locking parts and a photoelectric support member, the partition disposed inside the passageway extending perpendicularly relative to the longitudinal axis to divide the passageway into a connection opening part and a joint opening part, the at least one cylindrical convex part connected to the partition, projecting longitudinally into the connection opening part and defining a photoconductor entrance path in communication with and between the connection opening part and the joint opening part, the elastic claw disposed in the connection opening part and connected to and projecting generally longitudinally from the partition, the tubular main housing formed with an opposing pair of locking holes, the opposing pair of locking holes extending transversely relative to the longitudinal axis and being in communication with the joint opening part, each one of the locking parts connected exteriorly of the tubular main housing and projecting perpendicularly therefrom relative to the longitudinal axis and arranged in plan view relative to one another in a rectangular configuration with one pair of the opposed locking parts, the photoelectric support member connected to the partition, extending transversely relative to the longitudinal axis and disposed in the joint opening part; and a socket housing extending along the longitudinal axis and including a pair of side walls, a main wall connected to and disposed between the pair of side walls and a slotted locking pin, the slotted locking pin connected to the main wall, extending perpendicularly relative to the longitudinal axis and projecting away from the main wall, each side wall having a small locking projection attached thereto and projecting transversely and outwardly relative to the longitudinal axis, the main wall having at least one element attaching groove formed thereinto, wherein, the joint opening part is sized to slidably receive the socket housing such that the at least one element attaching groove is generally axially aligned with and facially opposed to the photoconductive entrance path of the at least one cylindrical convex part, the slotted locking pin is received by the joint opening part respective ones of the small locking projections are releasably engaged with respective ones of the opposing pair of locking holes to releasably retain the socket housing and the tubular main housing together.

* * * * *